Dec. 27, 1938.   R. LINDE ET AL   2,141,997
PROCESS FOR THE DECOMPOSITION OF AIR BY LIQUEFACTION AND RECTIFICATION
Filed May 5, 1937   2 Sheets-Sheet 1

Inventors
RICHARD LINDE
HELMUTH HAUSEN
By Potter, Pierce & Scheffler
their Attorneys.

Dec. 27, 1938.   R. LINDE ET AL   2,141,997
PROCESS FOR THE DECOMPOSITION OF AIR BY LIQUEFACTION AND RECTIFICATION
Filed May 5, 1937   2 Sheets-Sheet 2

Patented Dec. 27, 1938

2,141,997

UNITED STATES PATENT OFFICE 2,141,997

PROCESS FOR THE DECOMPOSITION OF AIR BY LIQUEFACTION AND RECTIFICATION

Richard Linde, Munich, and Helmuth Hausen, Solln, near Munich, Germany

Application May 5, 1937, Serial No. 140,972
In Germany May 19, 1936

8 Claims. (Cl. 62—175.5)

Periodically reversed cold storers or regenerators have been used for heat exchange in the decomposition of air by liquefaction and rectification. Decomposition products flow through the cold storers during one period and impart cold to the storing material, while in the next period fresh air is led through the cold storers in the reverse direction, taking up the cold stored therein by the decomposition products in the preceding period. Vapors, such as water vapor and carbon dioxide, contained in the fresh air, are precipitated on the storing material and are vaporized again and expelled in the following period by the decomposition products flowing through the storers in the reverse direction. A heat exchange of more than 98% is theoretically possible and the decomposition products may leave the storers at a temperature that is only a few degrees below the temperature of the fresh air supply.

In practice it has developed that in many cases, especially with the fresh air supply at a high temperature (more than 25° C.) and high humidity it is not possible to obtain such a favorable heat exchange even with storers of large size and capacity. Temperature differences between the decomposition products leaving the storers and the air entering them of 10° and more occur.

An object of the present invention is to improve the operation of cold storers working on warm, moist air. According to the invention, although the temperature of the decomposition products leaving the cold storers already is too low by comparison with the temperature of the air supply, an additional amount of cold is supplied to the storers by spraying water into the decomposition products passing therethrough.

The effect of this operation can be explained as follows:

With air entering at high temperatures, the amount of water vapor condensed therefrom in the warm end of the storer is so great that its heat of condensation equals or even exceeds the heat absorbing capacity of the air or the decomposition gases in the same temperature range. But the amount of water precipitated from the compressed fresh air during one run or period, even when the air is saturated, is vaporized by only a fraction of the decomposition products passing through the heat storer in, for instance, the first third or the first quarter of the next period, because the decomposition products have a volume greater than the air in reverse proportion to their pressures. A relatively large amount of cold is, therefore, imparted to the warm end of the storer at the beginning of the cooling period and the storing material becomes so cold that it cannot thereafter heat up the decomposition products to the temperature of admission of the fresh air during the remainder of the period. This results in the great temperature differences above referred to and a considerable loss of cold. The cooling period referred to is the period during which the cold storer is being cooled by the passage of decomposition products.

According to the invention, an additional amount of cold is supplied to the storers in such a way that after the vaporization of the water condensed from the air, at the beginning of the cooling period, further amounts of water are sprayed into the decomposition products. In this way the temperature of the issuing decomposition products is lowered further and the temperature difference between the discharged decomposition products and the fresh air supply is increased. However, not only this new increase in the cold loss, but also the larger part of the loss that results from the too rapid evaporation of the water separated out from the air, are compensated by the inexpensive cold produced by the evaporation of the sprayed water and as a result that portion of the cold loss which has to be compensated by expensive operation at the lowest temperatures attained in the decomposition process is greatly diminished.

The temperature of the storing material is reduced to the same extent as is the temperature of the decomposition products, the cold necessary for a rapid separation of water being supplied to it.

It has already been proposed to spray water into the decomposition products of an air decomposition process in order to cause a precooling of the air in cases in which the cold necessary for carrying on the decomposition is obtained by throttling the air to be decomposed, since, as is well known, the cold yield is increased by the precooling so obtained. With the use of periodically changed cold storers, however, the main amount of the air is supplied to the decomposition system at such a low pressure that its throttling does not yield any noteworthy amount of cold, so that the cold necessary for covering the losses has been provided heretofore by a separate refrigerating operation. Since moreover the heat of condensation of the vapors is exchanged with the decomposition products by the use of regenerators, a precooling of the air might appear unnecessary, at least with the practically equal heat capacities of the two gases. Due to the slight difference in pressure, the air would not be expected to be able to absorb the cold of the evaporation. The use of evaporation cooling was, therefore, not indicated in the present case.

It has moreover been proposed to compensate the cold loss occurring in an air conditioning system by spraying water into the exhaust air while it flows, for the purpose of heat exchange with the fresh air, through periodically reversed cold storers. In this way, the losses occurring in the refrigeration process are compensated in the usual manner at the lowest temperature attained, but only because of the fact that the final temperature of the cooling down is slight in comparison with that in air liquefaction is it possible to use evaporation cooling for this process. Only the present discovery that the great temperature differences occurring at high air admission temperatures are caused not as in other decomposition processes, chiefly by cold losses in the range of the lowest temperature, but by the operations at the warm end of the cold storers, has made possible the elimination of these difficulties by the simple use of evaporation cooling.

The new process will be explained more in detail and by way of illustration with reference to the decomposition of air into oxygen and nitrogen in connection with the accompanying drawings, in which:

Fig. 3 is a diagrammatic illustration of a second method of precooling the air before delivering it to the cold storers.

Figure 1:
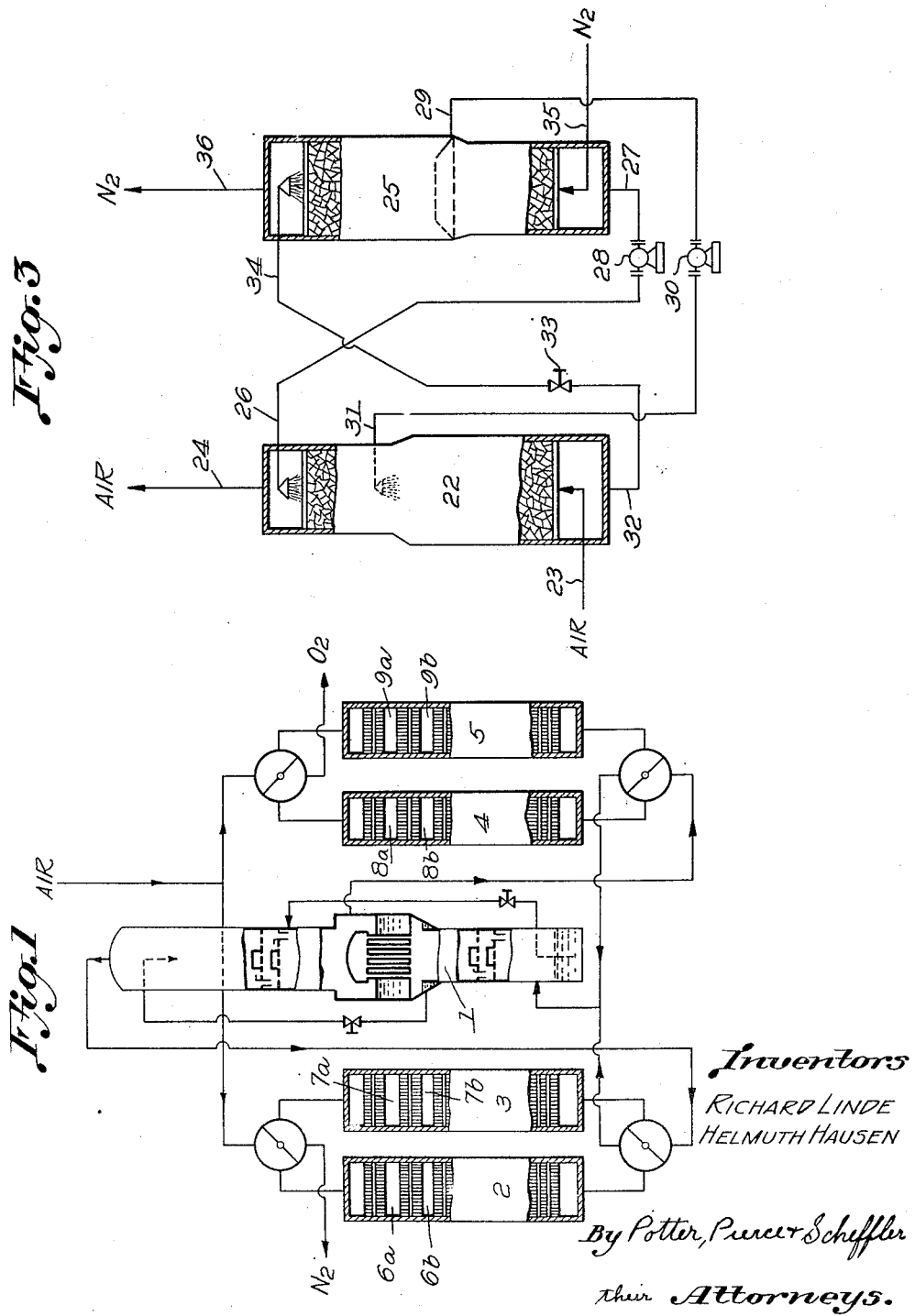
Fig. 1 is a diagrammatic showing of an air liquefying and rectifying plant.

In Fig. 1, 1 is a two-stage air decomposing apparatus of ordinary construction; 2 and 3 are cold storers in which the heat exchange occurs between the main amount of the air and the nitrogen separated in the decomposing plant, while the remainder of the air is cooled down in the regenerators 4 and 5 in heat exchange with the oxygen. The air has a pressure of 5 atmospheres and consequently the decomposition products have a five times greater volume with a pressure of about 1 atmosphere. The water condensed from the air can, therefore, be evaporated, after the reversing, in about the first fifth of the new period by the decomposition products, so that in this short time the main amount of the cold actually to be transferred to the heat storer in the whole cooling period is given off to the storing material. According to the invention, water is sprayed into the decomposition products in finely divided form as soon as the water condensed from the air is evaporated. In order to prevent frosting, the spraying is done at a place at which the temperature of the gas exceeds 4°; in certain cases the water is divided up and supplied at several places. For this purpose, recesses are provided in the storers at 6a and 6b, 7a and 7b, or 8a and 8b, and 9a and 9b, into which water can be introduced by means of an atomizing nozzle. The water injection is controlled by the reversing machine that causes the reversing of the regenerators.

Since an evaporative cooling can be effective only above 0°, i. e., only within the first 10–15% of the whole reduction of temperature occurring in the storer, it might be supposed that the water could be introduced at a distance from the warm end of the regenerator that amounts to at most only about $\frac{1}{10}$ to $\frac{1}{8}$ of the length of the storer. According to the invention, however, the water is introduced at least in part at a place that is even $\frac{1}{3}$ to $\frac{1}{4}$ of the length of the storer from the warm end thereof. The warm end of the storer is, of course, the end at which the air enters. It has been found, in particular, that a storer can have a temperature on the average of 0° and more in the middle, although air is cooled down in the same from room temperature to about −180°. The reason for this is that the water separation and evaporation at the warm end of the storer involve a considerably greater thermal load on the storing material in this region than in the cold region. The storer attempts to equalize this effect by diminishing the temperature drop at the warm end and by involving a larger storing mass for the heat exchange in this temperature range, at the expense of the cold end.

If, according to the invention, an excess of cold is supplied to the warm end of the storer, especially by evaporation cooling, the special advantage is attained that the differences in temperature during the heat exchange are increased in this portion of the storer, the temperature drop likewise being thereby increased so that with the new working method the amount of storing material available for the exchange of heat below the range of condensation of the water is increased and thus also the exchange conditions in the cold part of the storer are improved.

The advantages of the new process can be obtained likewise to a certain extent by other measures, with the aid of which an excess of cold can be supplied to the warm end of the storer and in an inexpensive way, this cold not originating in the costly peak low temperature phase of the process. For instance, gas cooled by a refrigerating machine to about 0° can be led, together with the decomposition products, through the warm end of the storer, or the giving-off of cold from the warm part of the cold storer in the warm period can be diminished by cooling a portion of the air down to about 0°, not in the storer, but separately; for instance, by means of a refrigerating machine, and then introducing it into the storer.

A somewhat different working method is afforded when the excess of cold is not applied directly to the warm end of the storer, but the air is sprayed with water before entering the storer, which water was cooled by the nitrogen leaving the cold storer. The amount of water that is thus vaporized by the nitrogen corresponds to the amount of water that otherwise would be sprayed into the storer for the purpose of evaporation cooling, while the remainder of the water gives the same cooling effect as the storing material. The two methods of operation are, therefore, equivalent with the difference that in the first method described, with stationary storing material, the gas flow is reversed, while with the other, the gas flows continuously and the water serving as heat exchange material is brought alternately into contact with the different gas currents.

Figure 2:
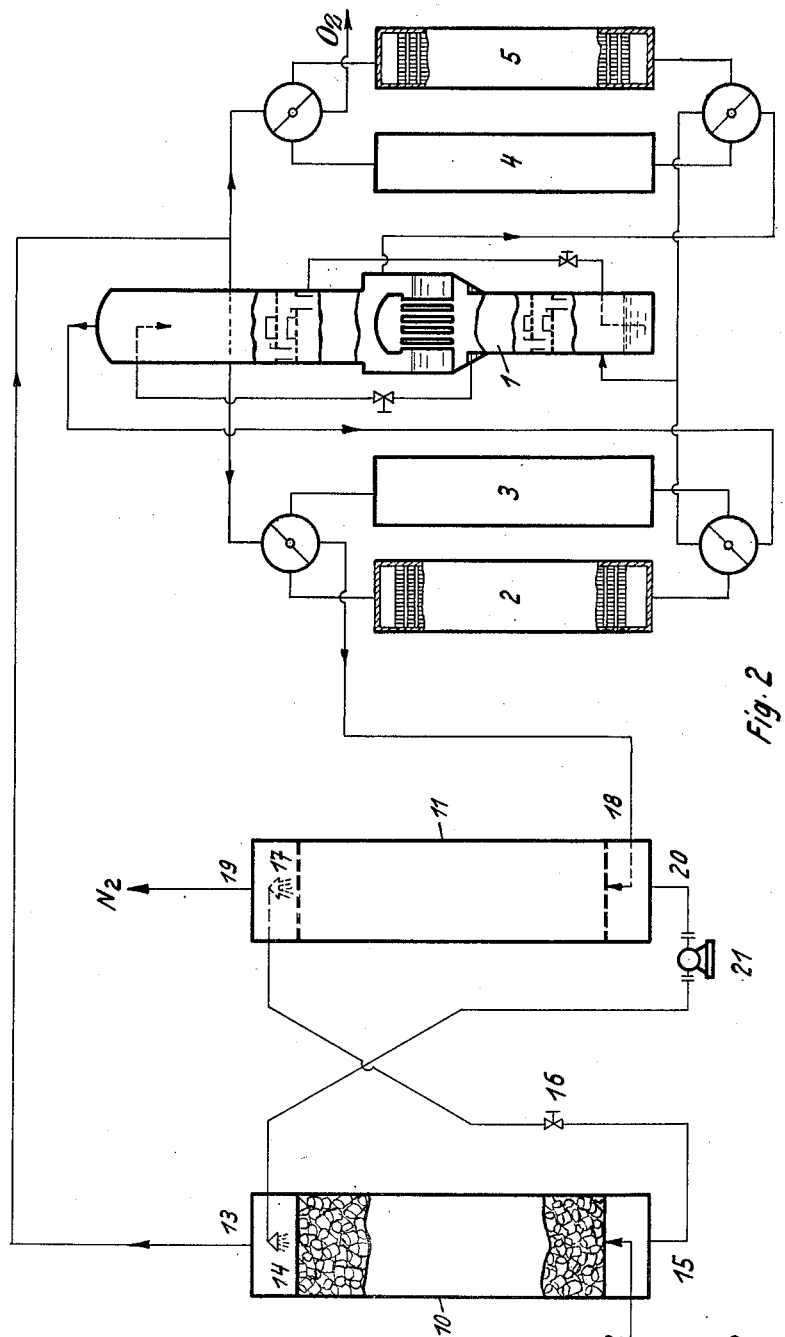
Fig. 2 is a diagrammatic showing of one method of precooling the air before it is delivered to the cold storers.

Fig. 2 illustrates an apparatus of the type in which the air is sprayed with water before entering the storer, the water being cooled by nitrogen leaving the cold storer.

In this apparatus the air cooler is indicated by the numeral 10 and the water cooler used for recooling the water, heated up in 10, is designated by the numeral 11. The air compressed to the decomposition pressure, for instance 5 atmospheres, heated to about 45° and saturated with water vapor, is admitted at 12 to the tower 10 and cooled in ascending it, the main amount of water contained in the same being precipitated thereby. The cooled air leaves the tower 10 at 13 and is delivered into the decomposition apparatus. The water supplied to tower 10 by the spray head 14 and heated up in the cooling down of the air is drawn off at 15 and relieved from pressure through the valve 16 and sprayed by means of the distributor 17 into the tower 11. At 18 the expanded nitrogen coming from the cold storer is admitted to the tower 11. Although the nitrogen amounts at most to 80% of the quantity of air cooled down in 10, its volume is a multiple of that of the air, due to the difference in pressure. The nitrogen consequently is far from saturated with water vapor, although it has absorbed the moisture content of the air in the periodically changed cold storer used for the heat exchange. The nitrogen can, therefore, evaporate a considerable amount of water in tower 11, and in addition to its cold contents, can give off a quantity of cold to the water which in general exceeds the amount of cold that is necessary for cooling the compressed air and for condensation of the water contained in the same. The nitrogen leaves tower 11 at 19, while the recooled water is taken off at 20 and is fed back by the pump 21 to the tower 10, into which it is introduced by means of the distributor 14.

The temperature, to which the air is cooled down by this method before entering the storer, adjusts itself automatically according to the thermal equilibrium between the regenerator and the precooling. It is based chiefly on the amount of the nitrogen, its degree of saturation dependent on the pressure ratio of the air to nitrogen, the temperature of admission of the air, the amount of water circulating, and the cold losses occurring during the precooling. Even with air admission temperatures of 45° and more, a cooling down of the air to about 5° is possible, with a pressure ratio between air and nitrogen of about 5 to 1, and thereby an extensive separation of the water contained in the same is possible, since up to these temperatures the amount of cold liberated by the saturation of the nitrogen with water exceeds the cold necessary for cooling down the compressed air and for condensing the water contained in the same in this temperature range. A prerequisite, however, is that the amount of water circulating between the air cooler and the water cooler is kept as small as possible. Only a slight excess over the necessary minimum amount of water, therefore, is used, this being calculated so that its cold content is sufficient to supply the amount of cold necessary for cooling down the air and for condensing the water, within the temperature differences occurring.

The amount of water to be condensed during the cooling down of the air is much greater at high temperatures than at low temperatures. The amount of cold necessary for cooling down the air and therefore the amount of cooling water is consequently greater at high temperatures than at lower temperatures. The temperature attainable during the precooling can be lowered by not carrying the entire amount of water uniformly through the towers as in the process according to Fig. 2, but by using a smaller amount of water in the cold part of the cooling towers than in the warm part as in Fig. 3. At the same time, the time necessary for reaching the equilibrium condition after starting is diminished.

Fig. 3 illustrates a somewhat different precooling procedure than that illustrated in Fig. 2. The liquefying and rectifying apparatus which may be the same as that in Fig. 2 is not illustrated.

In the precooling apparatus of Fig. 3, the air cooler is indicated by the numeral 22, the air being admitted to the same at 23 and leaving at 24. 25 is the water cooler, in which the water heated at 22 is cooled down again. The water is supplied to the tower 22 again at 26, after removal from tower 25 at 27 and compressing in the pump 28.

A portion of the water recooled in 25 is taken from the tower at 29 with medium temperature, for instance 20°, is compressed by the pump 30 to the decomposition gas pressure and is introduced at 31 into the tower 22 at a place agreeing with its temperature. Water leaving the tower 22 at 32 passes through the valve 33 into the top of tower 25 at 34 and nitrogen enters tower 25 at 35 and leaves the tower at 36. The diameter of the tower is suited to the amount of water circulating in the same, i. e., its diameter is kept smaller in the cold part, where a small amount of water is treated, than in the warmer part. The reduction of the amount of water in the cold parts can amount to 30–50% of the amount circulating in the warm part.

Instead of one air and one water cooler, each operated with different amounts of water in the warm and cold parts, two air and two water coolers can be installed. In one pair, the air or the water is cooled to the medium temperature of about 20°, while in the other pair, the cooling is carried on from 20° to the lowest attainable temperature, for instance 5°. In addition, it is possible to suit the amount of water circulating in the different parts of the towers still more to the cold requirements, and to divide up the amounts of water into more divisions for this purpose.

According to the new process, the air is precooled with minimum expense to a temperature of about 5° with the corresponding slight moisture content. The cold storer is, therefore, relieved from load to a great extent in the warm part, the temperature at the middle of the storer is lowered considerably and in this way indirectly a relative larger storing capacity is made available for the cooling down at low temperatures. This causes a reduction of the temperature fluctuations in the cold part of the storer so that the excess of the decomposition products over the air that must be carried out through the storer for keeping the fluctuations small in order to assure sublimation of the carbon dioxide can be diminished. Altogether, therefore, by the new method, the amount of high pressure air necessary for covering the cold losses and for providing the excess of decomposition products that is led out through the storer is reduced and thereby the power requirements are lowered.

The process has been described in the foregoing for the example of precooling air before its decomposition by liquefaction and rectification with the use of periodically changed cold storers for the heat exchange. It can be used in the same way for any desired gas mixtures that are to be cooled in cold storers. The cold transfer can moreover be accomplished in part indirectly.

We claim:

1. In a process for the decomposition of air by liquefaction and rectification in which air of high moisture content is prepared for the liquefaction and rectification by heat exchange with the decomposition products in a periodically changed cold storer, the step which consists in cooling the warm end of the cold storer in addition to the cold applied by the sensible cold of the decomposition products contacting therewith and that produced by the evaporative cooling of the water condensed from the air.

2. Process as defined in claim 1 in which the additional cold applied to the warm end of the cold storer is generated by evaporative cooling by the decomposition products.

3. Process as defined in claim 1 in which water is sprayed into the decomposition products passing through the cold storer only after the water deposited therein by the air has been evaporated.

4. Process as defined in claim 1 in which water is sprayed into the decomposition products passing through the cold storer at a point at which their temperature is above 4° C.

5. Process as defined in claim 1 in which water is sprayed into the decomposition products passing through the cold storer at a point which is from about ⅓ to about ¼ of the length of the cold storer from the warm end thereof.

6. Process as defined in claim 1 in which the additional cold is imparted to the warm end of the cold storer by precooling the air supply thereto by contact with water which has been cooled by evaporative cooling by contact with decomposition products which have passed through the cold storer.

7. Process as defined in claim 1 in which the decomposition products are passed through the cold storer in one direction during one period and the air is passed through the cold storer in the opposite direction in another period, the decomposition products after passing through the storer are contacted with water for cooling the same, and the so-cooled water is contacted with the air before it enters the cold storer, said water being repeatedly employed in said two steps and being regulated in amount to a quantity only sufficient to cool the air and condense its moisture content.

8. Process as defined in claim 1 in which decomposition products are passed during one period through the cold storer in one direction and air is passed during the next period in the opposite direction, the decomposition products after leaving the cold storer are passed in contact with a circulating body of water to cool the same, said body of water circulating in contact with the air before it enters the cold storer, and the quantity and temperature of the water coming from contact with the decomposition products into contact with the air is distributed in the stream of air in accordance with its temperature.

RICHARD LINDE.
HELMUTH HAUSEN.